Dec. 11, 1928.
M. J. FOWLER
1,694,813
LUBRICATOR
Filed May 28, 1923
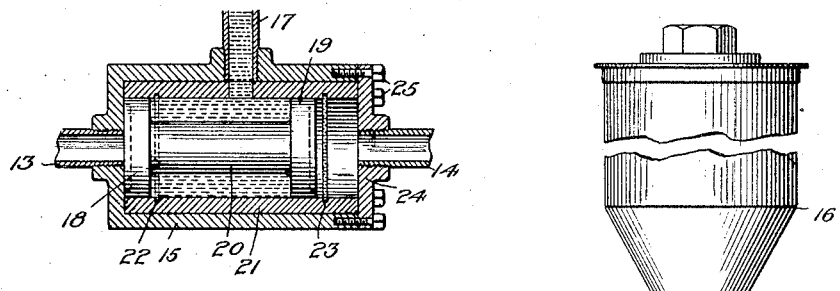
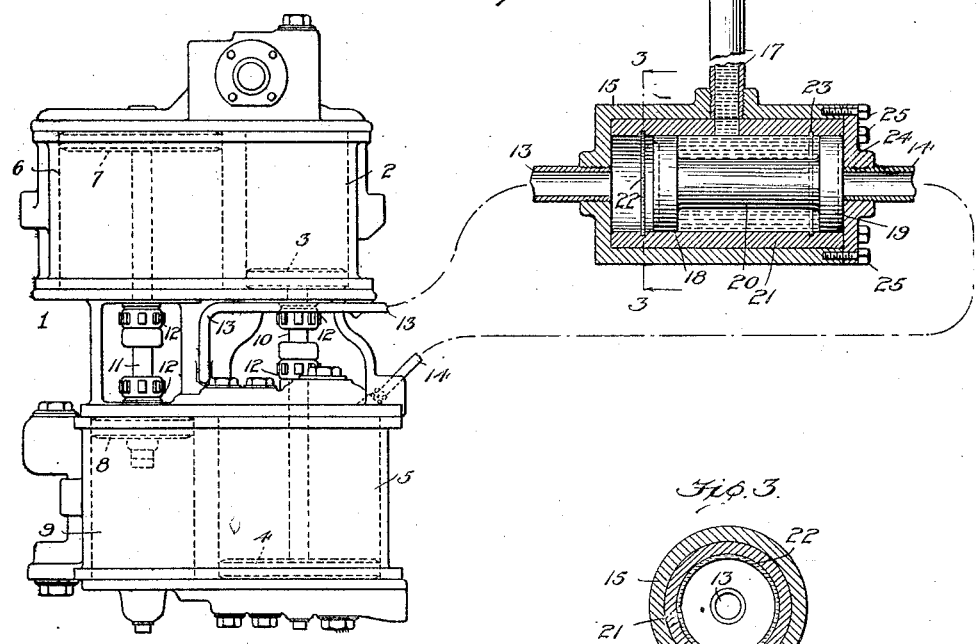
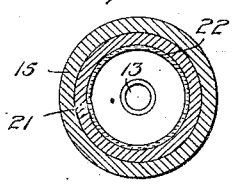

Patented Dec. 11, 1928.

1,694,813

UNITED STATES PATENT OFFICE.

MACK J. FOWLER, OF ROANOKE, VIRGINIA.

LUBRICATOR.

Application filed May 28, 1923. Serial No. 641,957.

The invention relates to lubricating devices and particularly to that class in which a predetermined supply of the lubricant is automatically supplied to a mechanism which provides the means for effecting the operation of the lubricating devices.

The principal feature of my invention is to provide a comparatively simple, reliable and durable lubricator of the automatic type and particularly adapted for use in connection with cross compound pumps such as are used on modern locomotives. In practice considerable difficulty is experienced in supplying the proper amount of lubricating material to the high and low pressure air cylinders of the pump, the various requirements thereof incident to its speed and intermittent operation in keeping up the air supply, presenting a problem of reliable and adequate lubrication which has heretofore remained unsolved.

The present invention has been designed to provide a lubricating device which will meet the requirements of a locomotive cross compound pump and other similarly operating machinery, and provide means for supplying a regular and uniform amount of lubricant which is effectively proportioned to the speed of the pump, thereby preventing the excessive use of said lubricant and in so doing provide for the economical upkeep of the pump.

The invention has for a further object the provision of an automatic lubricating apparatus operatively controlled by a floating type of piston valve adapted to be controlled through a pressure medium which preferably acts to produce suction alternately upon opposite ends of the piston valve and cause its reciprocation adjacent an oil reservoir for effecting a predetermined intermittent supply of oil from a plurality of points corresponding to the alternating reciprocations of the piston valve.

The invention further consists in the construction, arrangement and combination of the several parts hereinafter described and pointed out in the claims.

In the drawings illustrating my invention as embodied in and applied to the oil ducts of the high and low pressure air cylinders of a cross compound air pump,—

Figure 1 is a view in side elevation of a known form of locomotive cross compound air pump to which is shown connected by means of the diagrammatical dot and dash line pipe connections my lubricating device illustrated with portions thereof shown in longitudinal vertical section and other portions thereof in elevation.

Figure 2 is a detail vertical longitudinal sectional view of the oil cylinder or casing showing the piston valve member moved to another position to that shown in Fig. 1.

Figure 3 is a detail vertical transverse sectional view on the line 3—3 of Fig. 1.

The present invention has been designed primarily for use with locomotive air pumps of the class described, although it will be understood that various applications thereof can be made to other types and constructions of mechanisms whether they be mechanically, pneumatically or steam actuated.

Referring to the drawings wherein similar reference characters designate corresponding parts in the several views, a cross compound pump is indicated by the numeral 1, and includes among other things the high pressure steam cylinder 2, in which operates the piston 3 operatively connected to the piston 4 movable in the low pressure air cylinder 5, and the low pressure steam cylinder 6 having mounted therein the piston 7 operatively connected to the piston 8 adapted to reciprocate in the high pressure air cylinder 9. The piston rod 10 connects the pistons 3 and 4. The piston rod 11 connects the pistons 7 and 8, and suitable stuffing boxes 12 are provided through which the piston rods operate. The oil connections of the pump are indicated by the numerals 13 and 14, said connections being in the form of pipes attached respectively to the high and low pressure air cylinders 9 and 5 at the upper ends thereof. The pipes 13 and 14 are arranged to communicate with the opposite ends of the cylinder or casing 15 of the lubricating device the dot and dash lines indicating the said pipes in their leading to the broken away extensions projecting from the said casing 15.

The lubricating device includes an oil reservoir 16 having communication with the cylinder or casing 15 through the pipe connection 17 whereby the lubricant is caused to flow from the reservoir and provide a constant supply within the casing. While I have shown the present arrangement as a gravity flow it will be understood that other means may be used to keep a sufficient supply of lubricant within the casing for distribution according to the requirements.

Movably mounted within the cylinder 15 is a piston valve member comprising piston heads 18 and 19 suitably connected for synchronous movement by the piston stem 20. The piston valve is floatingly positioned within the casing, an intermediate portion thereof between the inner opposed faces of the pistons forming an oil chamber from which periodic deliveries of the lubricant is made alternately from each end of the casing when the piston valve is caused to reciprocate. The oil chamber formed between the piston heads is in constant communication with the reservoir 16 or other suitable source of supply of lubricating material with which the casing may be connected.

The interior of the casing 15 and more especially the bushing or sleeve member 21, is provided with annular grooves 22 and 23, respectively, arranged near each end of the casing and adapted to form chambers into which the lubricating material passes when said grooves are uncovered and brought into uninterrupted connection with the intermediate chamber portion containing the constant supply of oil, such as shown in Fig. 1 with the piston 19 moved to its extreme outer position, and in Fig. 2 with the piston 18 moved to its outermost position.

The bushing 21 is readily insertible into the casing 15 and held in place by the casing or cylinder head 24 connected thereto by means of the bolts 25. The grooves, or other types of recesses which may be formed in the bushing or sleeve, 21, may be formed of a size and shape proportionate to the requirements of the lubricating device, it being obvious that different bushings can be readily inserted for increasing or decreasing the supply of lubricant desired.

In operation, the piston valve is moved back and forth within the bushing, said valve acting to alternately trap a quantity of the oil in the grooves at the opposite ends of the bushing, from which grooves the oil is caused to flow to the high and low pressure air cylinders of the pump through the pipe connections 13 and 14. In Fig. 1 the piston 3 of the high pressure steam cylinder 2 has moved downwardly and caused the air piston to also correspondingly move within the low pressure air cylinder 5 and effect the egress of the oil, which was previously trapped in the annular groove 23, to flow by suction from the end of the casing through the pipe 14 and into the upper portion of the air cylinder 5 for lubricating the walls thereof. The passage of the steam to the low pressure steam cylinder 6 now causes the piston 7 to move downwardly, and correspondingly move the piston 8 in the high pressure air cylinder whereupon the oil which flowed into the annular groove 22 during the preceding movement of the floating piston valve member, will now be induced to flow by suction from this end of the casing through the pipe connection 13 and into the upper portion of the high pressure air cylinder for lubricating the walls thereof. It will be noted that upon each movement of the respective steam pistons of the pump that the pistons 18 and 19 in the lubricating device will be simultaneously moved, first in one direction and then in the opposite direction to effect the periodic flow of the oil and the subsequent periodic cut off of said flow whereby uniform amounts are measured and the regularity thereof predetermined by the rate of travel of the steam pistons or the speed at which they are caused to operate in replenishing the air supply of the system.

A lubricating apparatus constructed in accordance with the present invention provides a very reliable means for introducing the prescribed amount of lubricating material to the air cylinders, and to accomplish the same without imposing any appreciable amount of work upon the pump. It will be observed that the pistons 18 and 19 are in effect balanced in their operation within the casing, the oil held between the piston heads offering relatively slight resistance to the bodily movement of the pistons. A relative balance may be established between the induced suction, and such pressure as may be produced upon the return stroke of the pistons operating in the air cylinders. The displacement of the entire contents from each end of the casing 15 and the intervening pipe connections is preferably determined so that only the exact amount of oil desired for each size air cylinder is furnished.

Having thus described my invention, although it will be understood that the terms used herein are to be taken in their descriptive and not in a limiting sense, what I desire to secure by Letters Patent is:—

1. The combination with a cross compound air pump, of a lubricating device therefor and operable thereby, said lubricating device including a casing having opposite end portions in communication with the respective air cylinders of said pump, said casing being formed with spaced recesses and having an inlet opening arranged therebetween, a valve member having pistons between which and the walls of the casing is formed an intermediate oil chamber adapted to have constant communication with said inlet opening, said valve member being movable in said casing for alternately establishing communication between said intermediate chamber and said recesses and causing the respective pistons to alternately cut off a supply of lubricating material at each of the said ends of the casing to be delivered to the air cylinder of the pump when the latter is operated.

2. In a lubricating device of the class described, the combination with a casing, of a valve member having a plurality of pistons between which and the walls of the casing is formed an intermediate oil chamber adapted to have constant communication with a source of supply, and suction means connected with the ends of the casing, said valve member being adapted to be reciprocated in said casing by said suction means for alternately permitting predetermined quantities of oil to enter each end of the casing from the said intermediate oil chamber, and said suction means acting as the oil outlet means.

3. In a lubricating device of the class described, the combination with a casing, of a valve member having a plurality of pistons between which and the walls of the casing is formed an intermediate oil chamber adapted to have constant communication with a source of supply, means for receiving predetermined quantities of oil upon each reciprocation of the valve member, said means including an annular groove provided near each end of the casing adapted to be periodically brought into communication with said intermediate oil chamber through the operation of the said pistons.

4. In a lubricating device of the character described, a cylinder, an oil reservoir communicating with the cylinder at the intermediate portion thereof, said cylinder having outlets at its opposite ends, suction pipes connected with said outlets, a floating valve within the casing having end portions connected by a reduced portion, the reduced portion providing an annular chamber in constant communication with the oil reservoir, means within the casing for trapping a predetermined quantity of oil at each reciprocation of the floating valve.

5. In a lubricating device of the character described, a casing having an oil inlet at an intermediate point, suction pipes connected with the casing at opposite ends, a floating piston within the casing having valves connected by an intermediate reduced portion defining an annular space in constant communication with the oil inlet, and pockets within the casing for trapping a predetermined quantity of oil at each reciprocation of the piston.

6. In a lubricating device of the character described, a casing, a bushing therein, an oil inlet through the casing and bushing at the intermediate portion thereof, suction pipes connected with the opposite ends of the casing, a floating piston mounted for reciprocation within the bushing and including valve elements connected by an intermediate reduced portion defining an annular chamber in constant communication with the oil inlet, said bushing being provided near its ends with recesses adapted to be covered and uncovered by the valve for trapping a predetermined quantity of oil at each reciprocation of the piston.

7. In a lubricating device of the character described, a casing, a valve member having a plurality of pistons between which and the walls of the casing is formed an intermediate oil chamber adapted to have constant communication with a source of supply, means for trapping predetermined quantities of oil upon each reciprocation of the valve member, said means including a recess provided near each end of the casing adapted to be brought periodically into communication with said intermediate oil chamber through the operation of the pistons, and suction outlet means connected with both ends of the casing at points removed from said recesses.

In testimony whereof I affix my signature.

MACK J. FOWLER.